US012761396B2

(12) United States Patent
Teo et al.

(10) Patent No.: US 12,761,396 B2
(45) Date of Patent: Oct. 13, 2026

(54) TRANSITION METAL DICHALCOGENIDE COATED FLAT OPTICAL DEVICES HAVING SILICON-CONTAINING OPTICAL DEVICE STRUCTURES

(71) Applicant: Applied Materials, Inc., Santa Clara, CA (US)

(72) Inventors: Russell Chin Yee Teo, Palo Alto, CA (US); James Connolly, Palo Alto, CA (US); Chien-An Chen, San Jose, CA (US); Andrew Ceballos, Palo Alto, CA (US); Jing Jiang, Santa Clara, CA (US); Jhenghan Yang, San Jose, CA (US); Yongan Xu, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 257 days.

(21) Appl. No.: 18/275,383

(22) PCT Filed: Jan. 31, 2022

(86) PCT No.: PCT/US2022/014593

§ 371 (c)(1),
(2) Date: Aug. 1, 2023

(87) PCT Pub. No.: WO2022/165356

PCT Pub. Date: Aug. 4, 2022

(65) Prior Publication Data

US 2024/0111075 A1 Apr. 4, 2024

Related U.S. Application Data

(60) Provisional application No. 63/144,182, filed on Feb. 1, 2021.

(51) Int. Cl.
*G02B 1/00* (2006.01)

(52) U.S. Cl.
CPC .................................... *G02B 1/002* (2013.01)

(58) Field of Classification Search
CPC . G02B 1/002; G02B 1/10; G02B 1/14; G02B 1/12; G02B 2207/101; C23C 28/042; C23C 28/40; C23C 28/42; C23C 28/04
See application file for complete search history.

(56) References Cited

U.S. PATENT DOCUMENTS

2013/0269761 A1* 10/2013 Ardo ......................... C25B 1/55 438/74
2015/0115383 A1* 4/2015 Kokubun ............. H10H 20/819 257/432

(Continued)

FOREIGN PATENT DOCUMENTS

CN 110187420 A * 8/2019 ............. G02B 5/003
JP 2020141687 A 9/2020

(Continued)

OTHER PUBLICATIONS

International Search Report and Written Opinion dated May 10, 2022 for Application No. PCT/US2022/014593.

(Continued)

*Primary Examiner* — Matthew Y Lee
(74) *Attorney, Agent, or Firm* — Patterson + Sheridan, LLP

(57) ABSTRACT

Embodiments described herein relate to flat optical devices with a coating layer including monolayers selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TIS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof.

(Continued)

The coating layer is disposed over a plurality of optical device structures of the optical device. The monolayers may alternate between the materials to form the coating layer or may be a uniform coating layer of a single material. The coating layer is disposed over each optical device structure of the plurality of optical device structures.

20 Claims, 6 Drawing Sheets

(56) References Cited

U.S. PATENT DOCUMENTS

| | | | | |
|---|---|---|---|---|
| 2017/0017028 | A1* | 1/2017 | Miller | G02B 27/286 |
| 2018/0120595 | A1* | 5/2018 | Joo | G02F 1/19 |
| 2019/0033683 | A1* | 1/2019 | Ahmed | C23C 16/24 |
| 2020/0083037 | A1* | 3/2020 | Park | H10D 8/70 |
| 2020/0339484 | A1 | 10/2020 | Roy et al. | |
| 2020/0386926 | A1 | 12/2020 | Doshay et al. | |
| 2021/0063717 | A1* | 3/2021 | Valentine | G02B 1/005 |
| 2024/0006216 | A1* | 1/2024 | Kirk | C23C 14/35 |

FOREIGN PATENT DOCUMENTS

| | | | |
|---|---|---|---|
| KR | 20170069161 | A | 6/2017 |
| KR | 20180058647 | A | 6/2018 |
| KR | 20200076258 | A | 6/2020 |
| WO | 2019126673 | A1 | 6/2019 |
| WO | 2020046563 | A1 | 3/2020 |
| WO | 2021092068 | A1 | 5/2021 |
| WO | 2022074100 | A1 | 4/2022 |

OTHER PUBLICATIONS

Hong et al. Structuring Nonlinear Wavefront Emitted from Monolayer Transition-Metal Dichalcogenides. Research, vol. 2020, pp. 1-10. Apr. 15, 2020; pp. 1-8, and figures 1-6.
Japanese Application No. 2023-560520, Office Action dated Nov. 19, 2024, 6 pages.
Chang-Hua Liu et al., Ultrathin van der Waals Metalenses, Cornell University Library, Jul. 10, 2018, 22 pages.
Yang Xianguang et al., Monolayer MoS 2 for Nanoscale Photonics, Nanophotonics 2020, vol. 9, No. 7, Feb. 3, 2020, 21 pages.
European Application No. 22746818.8, Supplementary European Search Report, Nov. 21, 2024, 7 pages.
Korean Application No. 10-2023-7029516, Final Office Action dated Mar. 20, 2025, 7 pages.
Chen et al., Tungsten Disulfide-Gold Nanohole Hybrid Metasurfaces for Nonlinear Metalenses in the Visible Region, Nano Letters, 2018, 22 pages.
Yang et al., Plasmonic Hybrids of Two-Dimensional Transition Metal dichalcogenides and Nonoscale Metals: Artchitecture, Enhanced Optical Properties and Devices, Elsevier, Jan. 8, 2021, 24 pages.
Korean Application No. 10-2023-7029516, Office Action dated Jul. 29, 2024, 9 pages.
Japanese Application No. 2023-560520, Office Action dated Aug. 6, 2024, 10 pages.
Chinese Office Action for Application No. 202280019598.1 dated Apr. 24, 2026.

* cited by examiner

TRANSITION METAL DICHALCOGENIDE COATED FLAT OPTICAL DEVICES HAVING SILICON-CONTAINING OPTICAL DEVICE STRUCTURES

BACKGROUND

Field

Embodiments of the present disclosure generally relate to flat optical devices. More specifically, embodiments described herein relate to flat optical devices with a coating layer including monolayers selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof.

Description of the Related Art

Flat optical devices include arrangements of optical device structures with in-plane dimensions smaller than half a design wavelength of light, and an out-of-plane dimension of the order of or larger than the design wavelength. For example, optical device structures may have sub-micron dimensions, e.g., nanosized dimensions. Flat optical devices, such as metasurfaces, may consist of a single layer, or multiple layers of optical device structures.

Applying a coating to the optical device structures may allow the absorption and refraction of light. For example, semiconductor materials, such as germanium (Ge) are capable of absorbing and refracting light. However, these materials are difficult to integrate with the optical device structures of the flat optical device due to poor etch-selectivity and cross-contamination. Also, other materials, such as graphene, do not possess a bandgap and the light absorbing abilities are affected by changes in Fermi energy levels. Therefore, what is needed in the art are improved optical device structures and coatings therefor.

SUMMARY

In one embodiment, a device is provided. The device includes a flat optical device. The flat optical device is operable to focus light incident on the flat optical device. The flat optical device includes a plurality of optical device structures disposed in or on an upper surface of a substrate. The flat optical device further includes a coating layer disposed over each optical device structure of the plurality of optical device structures. The coating layer includes one or more monolayers. Each monolayer of the one or more monolayers has a composition selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof.

In another embodiment, a device is provided. The device includes a flat optical device. The flat optical device is operable to focus light incident on the flat optical device. The flat optical device is a metasurface. The flat optical device includes a plurality of optical device structures disposed in or on an upper surface of a substrate. The plurality of optical device structures have a critical dimension less than 1 micron. The flat optical device further includes a coating layer disposed over each optical device structure of the plurality of optical device structures. The coating layer includes one or more monolayers. Each monolayer of the one or more monolayers has a composition selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof.

In another embodiment, a device is provided. The device includes a camera. The device includes a flat optical device. The flat optical device is operable to focus light incident on the flat optical device to the camera. The flat optical device is a metasurface. The flat optical device includes a plurality of optical device structures disposed in or on an upper surface of a substrate. The flat optical device further includes a coating layer disposed over each optical device structure of the plurality of optical device structures. The coating layer includes one or more monolayers. Each monolayer of the one or more monolayers has a composition selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to flat optical devices. More specifically, embodiments described herein relate to flat optical devices with a coating layer including monolayers selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof. In one embodiment, a flat optical device is provided. The flat optical device includes a plurality of optical device structures disposed in or on an upper surface of a substrate. The flat optical device further includes a coating layer disposed over each optical device structure of the plurality of optical device structures. The coating layer includes one or more monolayers.

Figure 1A:
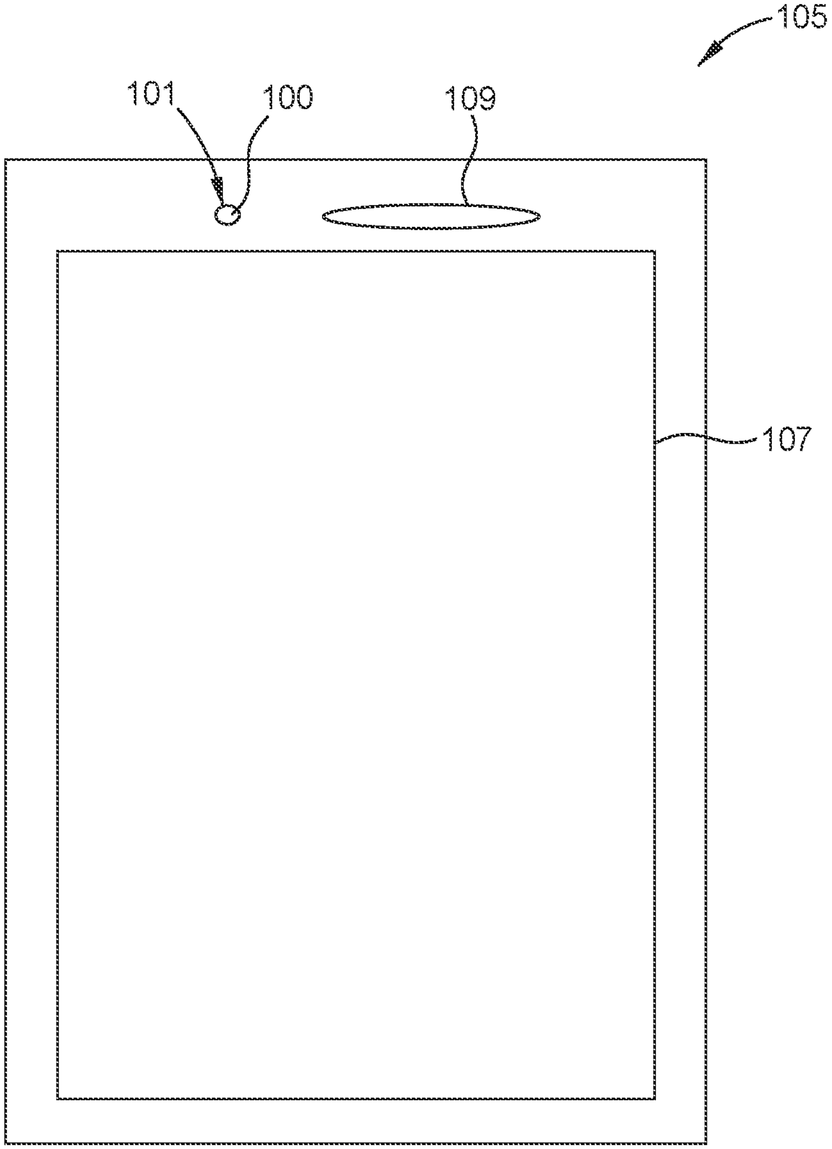
FIG. 1A is a schematic, front view of a device according to embodiments.

FIG. 1A is a schematic, front view of a device 105 according to embodiments. The device 105 may be a mobile phone (e.g., a smartphone). In this embodiment, the device 105 includes a front-facing camera 101, a speaker 109, and a display 107. The front-facing camera 101 includes a flat optical device 100. In one embodiment, which can be combined with other embodiments described herein, the flat optical device 100 is a metasurface. The flat optical device 100 of the front-facing camera 101 is configured to operate as a bio-authentication or facial recognition sensor. The flat optical device 100 includes a plurality of optical device structures (shown in FIGS. 1B and 1C) that are operable to focus light incident on the flat optical device 100 to the front-facing camera 101.

Figure 1B:
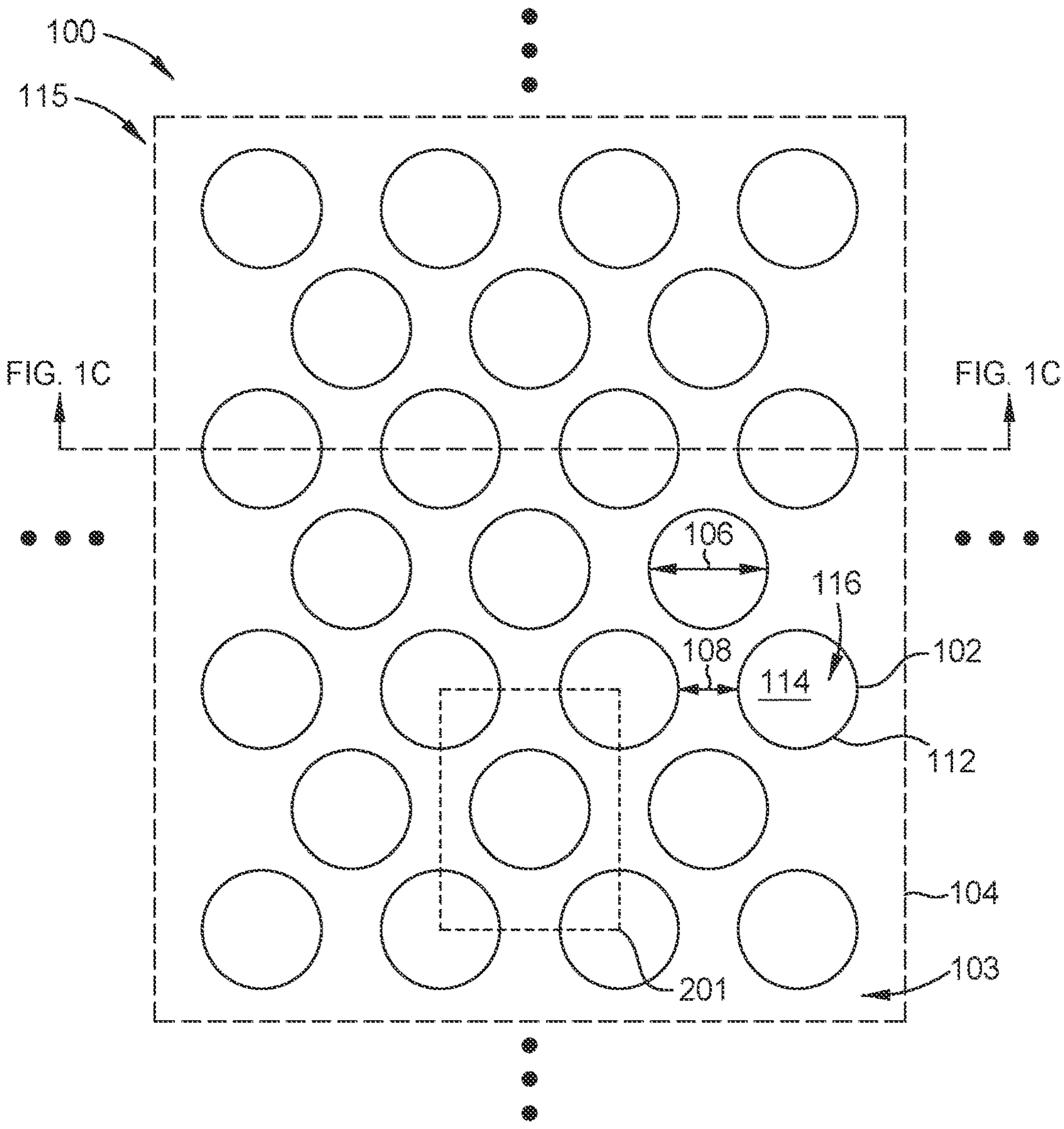
FIG. 1B is a schematic, top view of a flat optical device having one or more optical device structures according to embodiments.
Figure 1C:
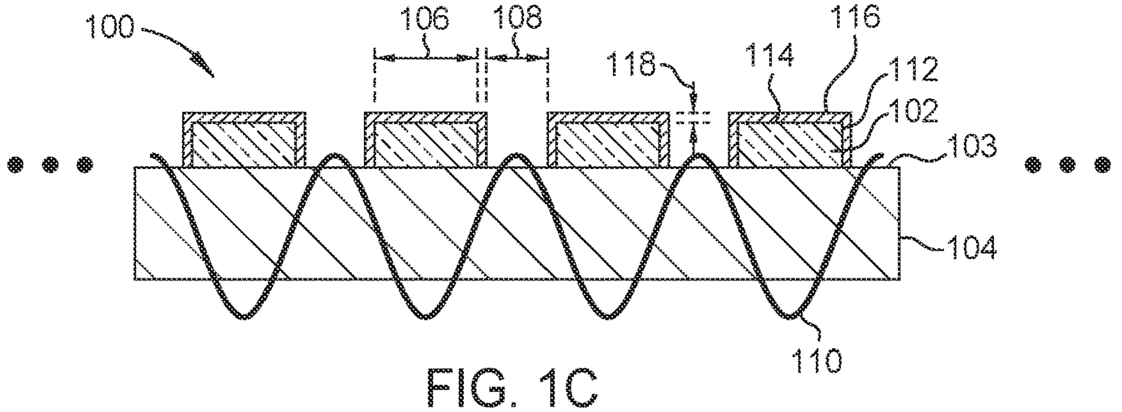
FIG. 1C is a schematic, cross-sectional view of a flat optical device having one or more optical device structures according to embodiments.

FIG. 1B is a schematic, top view, and FIG. 1C is a schematic, cross-sectional view of a portion 115 of a flat optical device 100 having one or more optical device structures 102 according to embodiments described herein. In one embodiment, which can be combined with other embodiments described herein, the flat optical device 100 is a flat optical device, such as a metasurface.

Embodiments described herein provide for the flat optical device 100 to include a plurality of optical device structures 102 disposed in or on an upper surface 103 of a substrate 104. The plurality of optical device structures 102 are nanostructures, having sub-micron dimensions, e.g., nano-sized dimensions. The plurality of optical device structures 102 include sidewalls 112 and a top surface 114. The plurality of optical device structures 102 have critical dimensions 106, e.g., one of the width or the diameter of the optical device structures 102. In one embodiment, which may be combined with other embodiments described herein, the critical dimension 106 is less than 1 micrometer (μm) and corresponds to the width or the diameter of the optical device structures 102, depending on the cross-section of the optical device structures 102. In another embodiment, which may be combined with other embodiments described herein, the critical dimensions 106 are about 100 nanometers (nm) to about 1000 nm.

While FIGS. 1B and 1C depict the optical device structures 102 as circular cross-sections, the cross-sections of the optical device structures 102 may have other shapes including, but not limited to, rectangular, triangular, elliptical, regular polygonal, irregular polygonal, or irregular shaped cross-sections. In some embodiments, which can be combined with other embodiments described herein, the cross-sections of the optical device structures 102 of the flat optical device 100 have different shaped cross-sections. In other embodiments, which can be combined with other embodiments described herein, the cross-sections of the optical device structures 102 of the flat optical device 100 have cross-sections with substantially the same shape. In some embodiments, which can be combined with other embodiments described herein, at least one of the critical dimensions 106 of an optical device structure 102 may be different from the other critical dimensions 106 of the optical device structures 102. In other embodiments, which can be combined with other embodiments described herein, the critical dimensions 106 of the optical device structure 102 are the same.

Gaps 108 are disposed between each of the optical device structures 102. In some embodiments, which can be combined with other embodiments described herein, one or more gaps 108 surrounding an optical device structure 102 are equal to or substantially equal to one or more other gaps 108 surrounding another optical device structure 102. In some embodiments, which can be combined with other embodiments described herein, one or more of the gaps 108 surrounding an optical device structure 102 are different from one or more other gaps 108 surrounding another optical device structure 102.

The substrate 104 may be formed from any suitable material, provided that the substrate 104 can adequately transmit light in a desired wavelength or wavelength range and can serve as an adequate support for the flat optical device 100 described herein. Substrate selection may include substrates of any suitable material, including, but not limited to, amorphous dielectrics, non-amorphous dielectrics, crystalline dielectrics, silicon oxide, polymers, and combinations thereof. In some embodiments, which may be combined with other embodiments described herein, the substrate 104 includes a transparent material. Suitable examples may include an oxide, sulfide, phosphide, telluride or combinations thereof. In one example, the substrate 104 includes silicon (Si), silicon dioxide ($SiO_2$), germanium (Ge), silicon germanium (SiGe), InP, GaAs, GaN, fused silica, quartz, sapphire, and high-index transparent materials such as high-refractive-index glass.

In one embodiment, which may be combined with other embodiments described herein, the material of the optical device structures 102 includes non-conductive materials, such as dielectric materials. The dielectric materials may include amorphous dielectrics and crystalline dielectrics. Examples of the dielectric materials include, but are not limited to, silicon-containing materials, such as silicon (Si), silicon nitride ($Si_3N_4$), silicon oxynitrides, and silicon dioxide ($SiO_2$). In one embodiment, which can be combined with other embodiments described herein, the optical device structures 102 may be formed nanoimprint lithography (NIL), and combinations thereof. The optical device structures 102 including the silicon-containing materials are transparent.

A coating layer 116 is disposed over the plurality of optical device structures 102. In one embodiment, which can be combined with other embodiments described herein, the coating layer 116 is conformal to the plurality of optical device structures 102. In another embodiment, which can be combined with other embodiments described herein, the coating layer 116 is non-conformal to the plurality of optical device structures 102. The coating layer 116 includes a layer thickness 118. The layer thickness 118 is between about 0.5 nm to about 75 nm. For example, the layer thickness 118 is between about 5.5 nm to about 70 nm, between about 10.5 nm to about 65 nm, between about 15.5 nm to about 60 nm, between about 20.5 nm to about 55 nm, between about 25.5 nm to about 50 nm, between about 30.5 nm to about 45 nm, and between about 35.5 nm to about 40 nm. The coating layer 116 improves the photon emission efficiency, thus reducing the critical dimensions 106 and thickness of the flat optical device 100. This will help reduce the physical footprint of the flat optical device 100. The photon emission efficiency is improved due to the coating layer 116 having multiple, high indirect band gaps. The high indirect band gaps allow for light-absorbing ability, which is unaffected by changes in Fermi energy levels.

Figure 3:
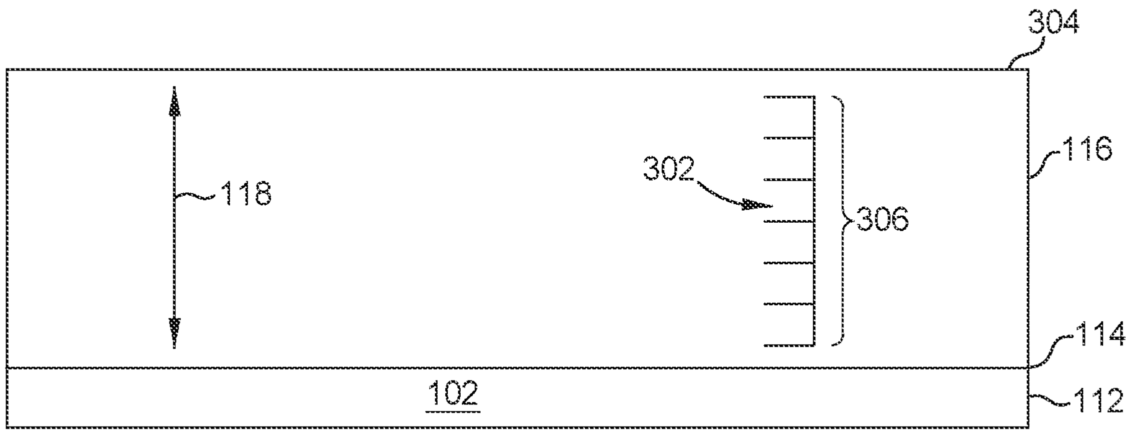
FIG. 3 is a schematic, cross-sectional view of a coating layer according to embodiments.

The coating layer 116 includes a range of monolayers 306, as shown in FIG. 3. The range of monolayers 306 are transition metal dichalcogenide (TMD) monolayers. The coating layer 116 has a composition selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof. The coating layer 116 has one of a single-crystalline lattice, a polycrystalline lattice, or an amorphous lattice. The single-crystalline lattice, the polycrystalline lattice, or the amorphous lattice may be provided by one or more of a chemical vapor deposition (CVD), flowable CVD (FCVD), physical vapor deposition (PVD), atomic layer deposition (ALD), multi-beam-epitaxy (MBE), ion-beam-assisted-deposition (IBAD), epitaxy, spin-on-glass (SoG), ion beam deposition (IBD), or spin-on-coat (SoC) processes.

As shown in FIG. 1C, a light beam 110 is incident on the flat optical device 100. The gaps 108 between each adjacent optical device structure 102 allows the light beam 110 to propagate through the substrate 104, the gaps 108, and the optical device structures 102, as the substrate 104, the gaps 108, and the optical device structures 102 are transparent. The substrate 104, the gaps 108, and the optical device structures 102 refract the light beam 110, changing the speed the light beam 110 travels as well as the direction the light beam 110 travels.

FIGS. 2A-2E are schematic, perspective views of configurations 201A-201E of a unit cell 201 of the flat optical device 100. In one embodiment, which can be combined with other embodiments described herein, the unit cell 201 may correspond to a portion or a whole surface of the substrate 104 of the flat optical device 100.

Each of the configurations 201A-201E of the unit cell 201 may include a capping layer 202 disposed over the coating layer 116. The capping layer 202 includes at least one of aluminum oxide ($Al_2O_3$), titanium oxide (TiO), tantalum oxide (TaO), silicon nitride ($Si_3N_4$), silicon dioxide ($SiO_2$), titanium nitride (TiN), titanium dioxide ($TiO_2$), silicon oxycarbide (SiOC), silicon carbide (SiC), or combinations thereof. The capping layer 202 can also include low-k, extreme low-k, and ultralow-k dielectric materials such as SiCONH, SiCOH, or combinations thereof. The capping layer 202 includes a capping layer thickness 204. The capping layer thickness 204 is between about 1 nm to about 60 nm. For example, the capping layer thickness 204 is between about 5 nm to about 55 nm, between about 10 nm to about 55 nm, between about 15 nm to about 50 nm, between about 20 nm to about 45 nm, between about 25 nm to about 40 nm, and between about 30 nm to about 35 nm. The capping layer 202 protects the coating layer 116 from being corroded or degraded during patterning processes and/or during use of the flat optical device 100. Further, the capping layer 202 confines the coating layer 116 to the optical device structures 102. The capping layer 202 may serve as an etch stop layer during patterning processes. Additionally, the capping layer 202 will help in patterning end point detection during patterning of the optical device structures 102.

Figure 2B:
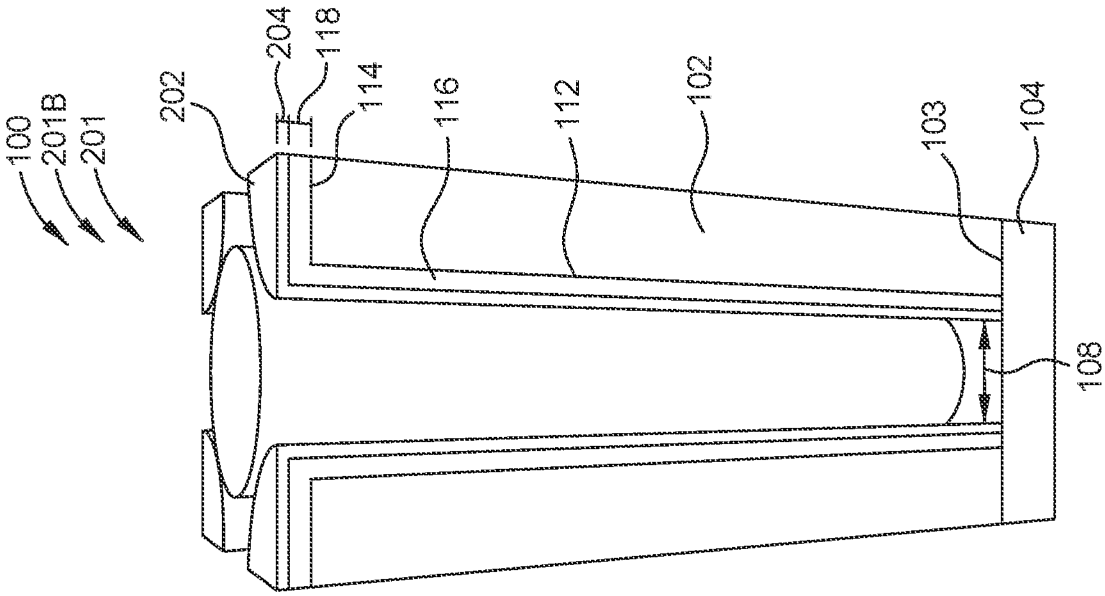
FIGS. 2A-2E are schematic, perspective views of a unit cell of a flat optical device having a coating layer disposed thereon according to embodiments.
Figure 2A:
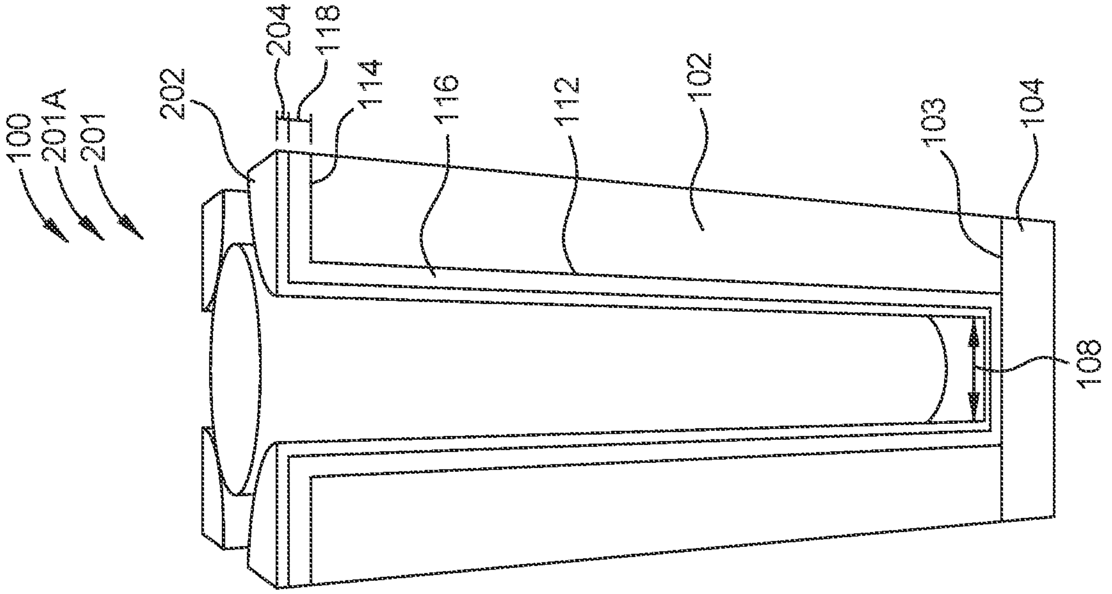

As shown in FIG. 2A, the first configuration 201A of the unit cell 201 has the coating layer 116 disposed over an upper surface 103 of the substrate 104, sidewalls 112 of the plurality of optical device structures 102, and a top surface 114 of the plurality of optical device structures 102. The capping layer 202 is disposed over the coating layer 116.

As shown in FIG. 2B, the second configuration 201B of the unit cell 201 has the coating layer 116 disposed on the sidewalls 112 of the plurality of optical device structures 102, and the top surface 114 of the plurality of optical device structures 102. The capping layer 202 is disposed on the sidewalls 112 of the plurality of optical device structures 102, and the top surface 114 of the plurality of optical device structures 102. The upper surface 103 of the substrate 104 is exposed. In one embodiment, which can be combined with other embodiments described herein, the coating layer 116 and the capping layer 202 can be selectively deposited over the sidewalls 112 of plurality of optical device structures 102 and the top surface 114 of the plurality of optical device structures 102. In another embodiment, which can be combined with other embodiments described herein, the coating layer 116 and the capping layer 202 disposed on the upper surface 103 of the substrate 104 can be etched.

Figure 2D:
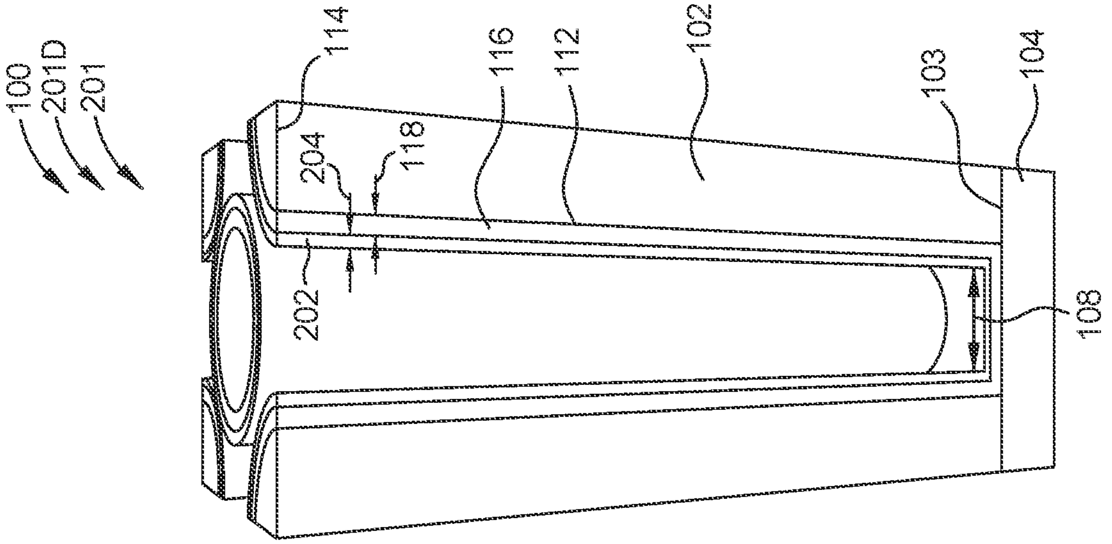
Figure 2C:
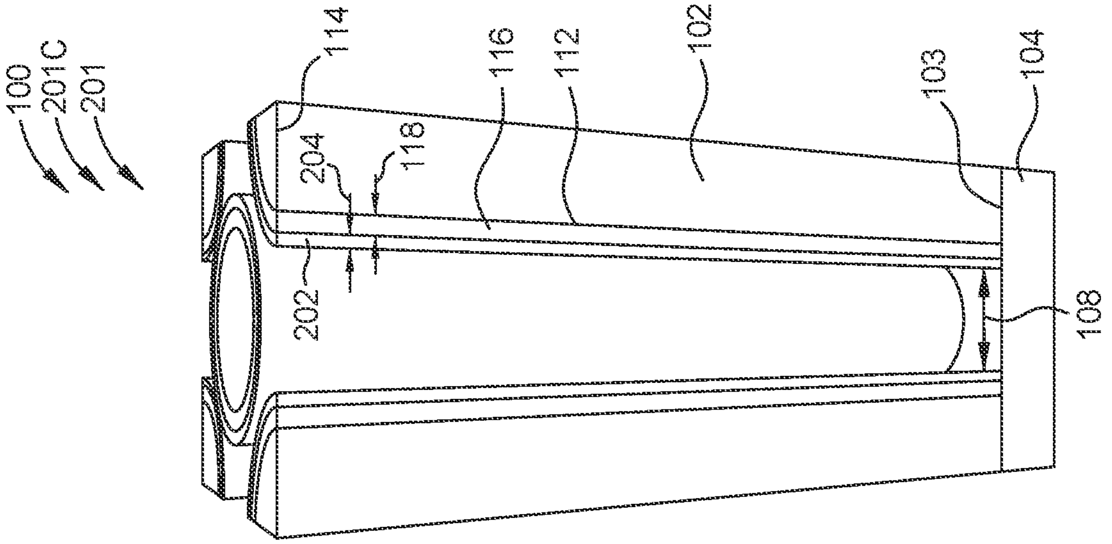

As shown in FIG. 2C, the third configuration 201C of the unit cell 201 has the coating layer 116 disposed on the sidewalls 112 of the plurality of optical device structures 102. The capping layer 202 is disposed on the sidewalls 112 of the plurality of optical device structures 102. The upper surface 103 of the substrate 104 is exposed. The top surface 114 of each optical device structure 102 of the plurality of optical device structures 102 is exposed. In one embodiment, which can be combined with other embodiments described herein, the coating layer 116 and the capping layer 202 can be selectively deposited over the sidewalls 112 of plurality of optical device structures 102. In another embodiment, which can be combined with other embodiments described herein, the coating layer 116 and the capping layer 202 disposed on the upper surface 103 of the substrate 104 and the top surface 114 of the plurality of optical device structures 102 can be etched.

As shown in FIG. 2D, the fourth configuration 201D of the unit cell 201 has the coating layer 116 disposed on the sidewalls 112 of the plurality of optical device structures 102 and the upper surface 103 of the substrate 104. The capping layer 202 is disposed on the sidewalls 112 of the plurality of optical device structures 102 and the upper surface 103 of the substrate 104. The top surface 114 of each optical device structure 102 of the plurality of optical device structures 102 is exposed. In one embodiment, which can be combined with other embodiments described herein, the coating layer 116 and the capping layer 202 can be selectively deposited over the sidewalls 112 of the plurality of optical device structures 102 and the upper surface 103 of the substrate 104. In another embodiment, which can be combined with other embodiments described herein, the coating layer 116 and the capping layer 202 disposed on the top surface 114 of the plurality of optical device structures 102 can be etched.

Figure 2E:
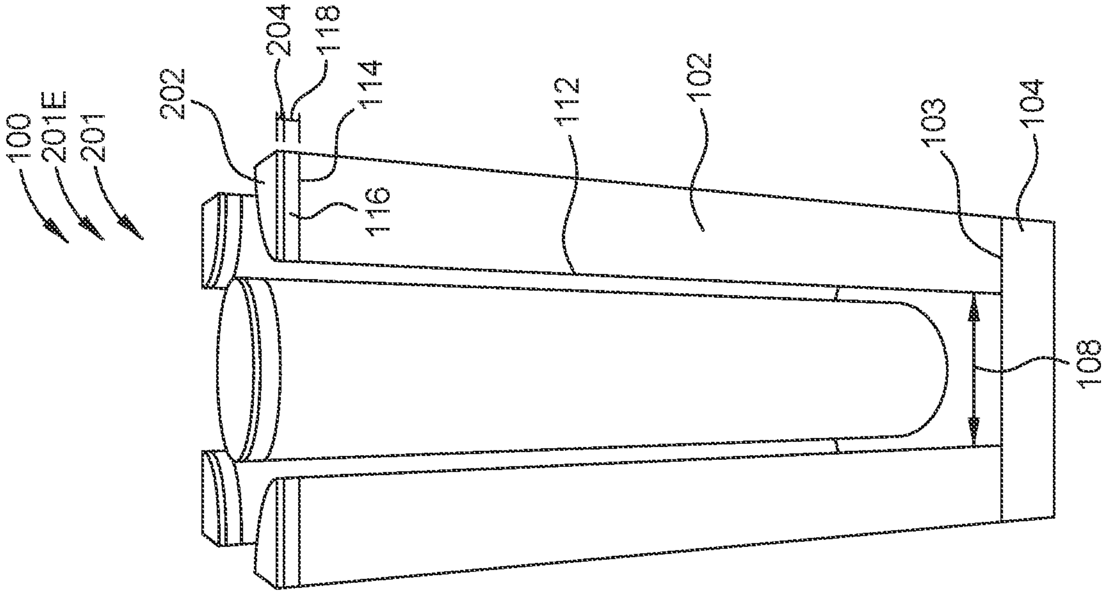

As shown in FIG. 2E, the fifth configuration 201E of the unit cell 201 has the coating layer 116 disposed on the top surface 114 of each optical device structure 102 of the plurality of optical device structures 102. The capping layer 202 is disposed on the top surface 114 of each optical device structure 102 of the plurality of optical device structures 102. The sidewalls 112 of each optical device structure 102 of the plurality of optical device structures 102 is exposed. The upper surface 103 of the substrate 104 is exposed. In one embodiment, which can be combined with other embodiments described herein, the coating layer 116 and the capping layer 202 can be selectively deposited over the top surface 114 of each optical device structure 102 of the plurality of optical device structures 102. In another embodiment, which can be combined with other embodiments described herein, the coating layer 116 and the capping layer 202 disposed on the sidewalls 112 of plurality of optical device structures 102 and the upper surface 103 of the substrate 104 can be etched.

Each of the configurations 201A-201E of the unit cell 201 may include the coating layer 116 and the capping layer 202 selectively deposited over the sidewalls 112 of plurality of optical device structures 102 and the top surface 114 of the plurality of optical device structures 102. To form the configurations 201A-201E, one or more conformal layers of the coating layer 116 and the capping layer 202 are deposited. One or more additional layers of the coating layer 116 and the capping layer 202 are deposited after patterning the optical device structures 102. The coating layer 116 and the capping layer 202 are then selectively etched to form the configurations 201A-201E.

FIG. 3 is a schematic, cross-sectional view of a coating layer 116. The coating layer 116 is disposed on a top surface 114 of an optical device structure 102. The coating layer 116 includes an upper surface 304 and a layer thickness 118. The layer thickness 118 of the coating layer 116 is divided into a range of monolayers 306 measured from the top surface 114 corresponding to 0% of the layer thickness 118 to the upper surface 304 corresponding to 100% of the layer thickness 118. Each monolayer 302 of the range of monolayers 306 can be separately deposited. Each monolayer 302 of the range of monolayers 306 of the coating layer 116 is deposited by one or more of a CVD, FCVD, PVD, ALD, MBE, IBAD, epitaxy, SoG, IBD, or SoC processes.

Although, only 6 monolayers 302 are shown in FIG. 3, the range of monolayers 306 can include between about 1 and about 100 monolayers 302. In one embodiment, which can be combined with other embodiments described herein, the range of monolayers 306 can include between about 2 and about 8 monolayers 302. In one embodiment, which can be combined with other embodiments described herein, each monolayer 302 is conformal to the optical device structures 102. In another embodiment, which can be combined with other embodiments described herein, the coating layer 116 is non-conformal to the optical device structures.

Each monolayer 302 of the range of monolayers 306 has a composition selected from the group consisting of $MoS_2$, $WS_2$, $WSe_2$, $MoSe_2$, $MoTe_2$, $TiS_2$, $ZrS_2$, $ZrSe_2$, $HfS_2$, $PtS_2$, $SnS_2$, or combinations thereof. In one embodiment, which can be combined with other embodiments described herein, the composition of each monolayer 302 of the range of monolayers 306 is the same material. In another embodiment, which can be combined with other embodiments described herein, adjacent monolayers 302 of the range of monolayers 306 alternate between a first composition and a second composition. The first composition and the second composition are different from each other. The first composition and the second composition are deposited sequentially throughout the layer thickness 118 of the coating layer 116 such that the first composition and the second composition are alternated in the range of monolayers 306. The monolayers 302 are deposited until a predetermined layer thickness 118 is reached. In yet another embodiment, which can be combined with other embodiments described herein, a third composition can be alternated with the first composition and the second composition to form the coating layer 116. The first composition, the second composition, and the third composition are different from each other. The first composition, the second composition, and the third composition are selected from the group consisting of $MoS_2$, $WS_2$, $WSe_2$, $MoSe_2$, $MoTe_2$, $TiS_2$, $ZrS_2$, $ZrSe_2$, $HfS_2$, $PtS_2$, $SnS_2$, or combinations thereof.

The range of monolayers 306 includes multiple high indirect band gaps. To improve the performance of the flat optical device 100, materials having compositions with high indirect band gaps are utilized. In one embodiment, which can be combined with other embodiments described herein, the band gaps for the coating layer 116 are between about 0.3 ev and about 2.3 eV. The band gaps of the optical device structures 102 are less than the band gaps of the coating layer 116. The coating layer 116 has a high indirect band gap, thus reducing the critical dimensions 106 and thickness of the flat optical device 100. This allows for direct integration with a small pitch & thin CNOS (Si) device. The reduced thickness causes the coating layer 116 to have limited surface roughness scattering, making the coating layer 116 less prone to line edge roughness and line width roughness, thus enhancing contrast during etching.

The range of monolayers 306 also includes a higher mobility than the mobility of the plurality of optical device structures 102. The higher mobility of the coating layer 116 increases the performance of the flat optical device 100. As mobility does not degrade at higher electric fields, the flat optical device 100 is operable to detect multiple colors for improved performance of the flat optical device 100. Additionally, the mobility of the coating layer 116 allows for advanced node intraconnection (e.g., complementary metal-oxide-semiconductor (CMOS) intraconnection). The mobility for the $WSe_2$ monolayer is about 250 $cm^2/Vs$. The mobility for the $MoS_2$ monolayer is between about 30 $cm^2/Vs$ and about 50 $cm^2/Vs$. The mobility of the $WS_2$ monolayer is between about 150 $cm^2/Vs$ and about 200 $cm^2/Vs$.

The range of monolayers 306, having the composition as described above, allows the plurality of optical device structures 102 to remain transparent while still capable of guiding a light beam 110 (shown in FIG. 1B) with low light losses at broadband imaging wavelengths. The range of monolayers 306 is operable to absorb and refract the light beam 110 (shown in FIG. 1B). As such, the flat optical device 100 may be used for photo detection. The range of monolayers 306 improves the photon emission efficiency of the flat optical device 100. Further, the range of monolayers 306 allow for guidance of light beams at broadband communication wavelengths. As the composition of the coating layer exhibits a high Pockels effect, the flat optical device 100 has improved photo detection capabilities and improved image processing capabilities.

The capping layer 202 may be deposited over the upper surface 304 of the coating layer 116. The capping layer 202 includes at least one of $Al_2O_3$, TiO, TaO, $Si_3N_4$, $SiO_2$, TiN, $TiO_2$, SiOC, SiC, or combinations thereof. The capping layer 202 can also include low-k, extreme low-k, and ultralow-k dielectric materials such SiCONH, SiCOH, or combinations thereof.

Figure 4:
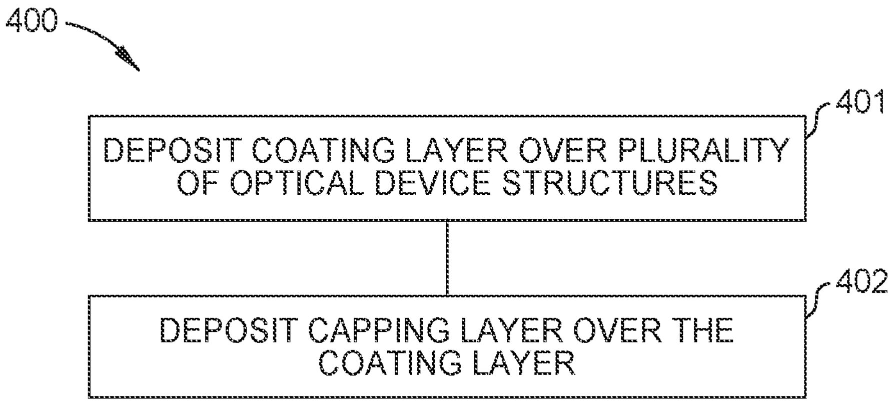
FIG. 4 is a flow diagram of a method of forming a flat optical device having one or more unit cells, as shown in FIGS. 2A-2E according to embodiments.

FIG. 4 is a flow diagram of a method 400 of forming a flat optical device 100 having one or more unit cells 201. At operation 401, a coating layer 116 is deposited over a plurality of optical device structures 102. In one embodiment, which can be combined with other embodiments described herein, the coating layer 116 including the range of monolayers 306 is selectively deposited on the plurality of optical device structures 102. The coating layer 116 is deposited by one or more of a CVD, FCVD, PVD, ALD, MBE, IBAD, epitaxy, SoG, IBD, or SoC processes. In another embodiment, which can be combined with other embodiments described herein, the coating layer 116 including the range of monolayers 306 is deposited and then etched. The coating layer 116 can be etched by one of ion-beam etching, reactive ion etching, electron-beam (e-beam) etching, wet etching, or combinations thereof.

At optional operation 402, a capping layer 202 is deposited over the coating layer 116. In one embodiment, which can be combined with other embodiments described herein, the capping layer 202 is selectively deposited on the coating layer 116. The capping layer 202 is deposited by one or more of a CVD, FCVD, PVD, ALD, MBE, IBAD, epitaxy, SoG, IBD, or SoC processes. In another embodiment, which can be combined with other embodiments described herein, the capping layer 202 is deposited and then etched. The capping layer 202 can be etched by one of ion-beam etching, reactive ion etching, electron-beam (e-beam) etching, wet etching, or combinations thereof.

In summation, optical devices with a coating layer including monolayers selected from the group consisting of $MoS_2$, $WS_2$, $WSe_2$, $MoSe_2$, $MoTe_2$, $TiS_2$, $ZrS_2$, $ZrSe_2$, $HfS_2$, $PtS_2$, $SnS_2$, or combinations thereof are disclosed herein. The coating layer is disposed over a plurality of optical device structures of the optical device. A range of monolayers forms the coating layer. The monolayers may alternate between the materials to form the coating layer or may be a uniform coating layer of a single material. The coating layer is disposed over each optical device structure of the plurality of optical device structures to improve the bandgaps of the flat optical device, allow the flat optical device to absorb and diffract light with efficient photon emission capabilities.

While the foregoing is directed to examples of the present disclosure, other and further examples of the disclosure may be devised without departing from the basic scope thereof, and the scope thereof is determined by the claims that follow.

What is claimed is:

1. A device, comprising:
- a flat optical device operable to focus light incident on the flat optical device, the flat optical device comprising:
  - a substrate comprising a transparent material;
  - a plurality of optical device structures disposed in or on an upper surface of the substrate; and
  - a coating layer disposed over each optical device structure of the plurality of optical device structures, the coating layer comprising:
    - one or more monolayers, each monolayer of the one or more monolayers having a composition selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof.

2. The device of claim 1, wherein the flat optical device further comprises a capping layer disposed over the coating layer, the capping layer including at least one of aluminum oxide ($Al_2O_3$), titanium oxide (TiO), tantalum oxide (TaO), silicon nitride ($Si_3N_4$), silicon dioxide ($SiO_2$), titanium nitride (TiN), titanium dioxide ($TiO_2$), silicon oxycarbide (SiOC), silicon carbide (SiC), or combinations thereof.

3. The device of claim 1, wherein the plurality of optical device structures has a critical dimension less than 1 micron corresponding to a width or a diameter of a cross section of the plurality of optical device structures.

4. The device of claim 1, wherein a composition of each monolayer of the one or more monolayers is the same.

5. The device of claim 1, wherein adjacent monolayers of the one or more monolayers alternate between a first composition and a second composition, the first composition and second composition are different from each other and are selected from the group consisting of $MoS_2$, $WS_2$, $WSe_2$, $MoSe_2$, $MoTe_2$, $TiS_2$, $ZrS_2$, $ZrSe_2$, $HfS_2$, $PtS_2$, $SnS_2$, or combinations thereof.

6. The device of claim 1, wherein adjacent monolayers of the one or more monolayers alternate between a first composition, a second composition, and a third composition, the first composition, the second composition, and the third composition are different from each other and are selected from the group consisting of $MoS_2$, $WS_2$, $WSe_2$, $MoSe_2$, $MoTe_2$, $TiS_2$, $ZrS_2$, $ZrSe_2$, $HfS_2$, $PtS_2$, $SnS_2$, or combinations thereof.

7. The device of claim 1, wherein the one or more monolayers have an amorphous lattice.

8. The device of claim 1, wherein the coating layer is disposed on the upper surface of the substrate, sidewalls of each optical device structure, and a top surface of each optical device structure.

9. The device of claim 1, wherein the coating layer is disposed on sidewalls of each optical device structure and a top surface of each optical device structure, while the upper surface of the substrate remains uncoated.

10. The device of claim 1, wherein the coating layer is disposed on sidewalls of each optical device structure, while the upper surface of the substrate and a top surface of each optical device structure remain uncoated.

11. The device of claim 1, wherein the coating layer is disposed on the upper surface of the substrate and sidewalls of each optical device structure, while a top surface of each optical device structure remains uncoated.

12. The device of claim 1, wherein the coating layer is disposed on a top surface of each optical device structure, while sidewalls of each optical device structure and the upper surface of the substrate remain uncoated.

13. The device of claim 1, wherein the flat optical device is a metasurface.

14. A device, comprising:
- a flat optical device operable to focus light incident on the flat optical device, wherein the flat optical device is a metasurface, the flat optical device comprising:
  - a substrate comprising a transparent material;
  - a plurality of optical device structures disposed in or on an upper surface of the substrate, wherein the plurality of optical device structures have a critical dimension less than 1 micron; and
  - a coating layer disposed over each optical device structure of the plurality of optical device structures, the coating layer comprising:
    - one or more monolayers, each monolayer of the one or more monolayers having a composition selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof.

15. The device of claim 14, wherein a composition of each monolayer of the one or more monolayers is the same.

16. The device of claim 14, wherein adjacent monolayers of the one or more monolayers alternate between a first composition and a second composition, the first composition and second composition are different from each other and are selected from the group consisting of $MoS_2$, $WS_2$, $WSe_2$, $MoSe_2$, $MoTe_2$, $TiS_2$, $ZrS_2$, $ZrSe_2$, $HfS_2$, $PtS_2$, $SnS_2$, or combinations thereof.

17. The device of claim 14, wherein the flat optical device is a metasurface.

18. A device, comprising:

a camera; and a flat optical device operable to focus light incident on the flat optical device to the camera, wherein the flat optical device is a metasurface, the flat optical device comprising:

a substrate comprising a transparent material;

a plurality of optical device structures disposed in or on an upper surface of the substrate; and a coating layer disposed over each optical device structure of the plurality of optical device structures, the coating layer comprising:

one or more monolayers, each monolayer of the one or more monolayers having a composition selected from the group consisting of molybdenum disulfide ($MoS_2$), tungsten disulfide ($WS_2$), tungsten diselenide ($WSe_2$), molybdenum diselenide ($MoSe_2$), molybdenum ditelluride ($MoTe_2$), titanium disulfide ($TiS_2$), zirconium disulfide ($ZrS_2$), zirconium diselenide ($ZrSe_2$), hafnium disulfide ($HfS_2$), platinum disulfide ($PtS_2$), tin disulfide ($SnS_2$), or combinations thereof.

19. The device of claim 18, wherein the flat optical device further comprises a capping layer disposed over the coating layer, the capping layer including at least one of aluminum oxide ($Al_2O_3$), titanium oxide (TiO), tantalum oxide (TaO), silicon nitride ($Si_3N_4$), silicon dioxide ($SiO_2$), titanium nitride (TiN), titanium dioxide ($TiO_2$), silicon oxycarbide (SiOC), silicon carbide (SiC), or combinations thereof.

20. The device of claim 18, wherein the flat optical device is a metasurface.

* * * * *